United States Patent
Shimooka

(10) Patent No.: US 9,202,654 B2
(45) Date of Patent: Dec. 1, 2015

(54) MEMS DEVICE AND MANUFACTURING METHOD THEREOF

(71) Applicant: KABUSHIKI KAISHA TOSHIBA, Minato-ku, Tokyo (JP)

(72) Inventor: Yoshiaki Shimooka, Sagamihara (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 184 days.

(21) Appl. No.: 13/962,909

(22) Filed: Aug. 8, 2013

(65) Prior Publication Data

US 2014/0291136 A1 Oct. 2, 2014

(30) Foreign Application Priority Data

Apr. 1, 2013 (JP) ................. 2013-076323

(51) Int. Cl.
*H01H 59/00* (2006.01)
*H01H 1/00* (2006.01)
*H01G 5/16* (2006.01)
*H01G 5/014* (2006.01)

(52) U.S. Cl.
CPC .......... *H01H 59/0009* (2013.01); *H01G 5/014* (2013.01); *H01G 5/16* (2013.01); *H01H 1/0036* (2013.01); *H01H 2001/0084* (2013.01); *Y10T 29/4913* (2015.01)

(58) Field of Classification Search
CPC .......... H01L 23/28; H01L 29/84; H05K 1/16; H01H 59/00
USPC ........................................ 200/600
See application file for complete search history.

(56) References Cited

U.S. PATENT DOCUMENTS

| | | | |
|---|---|---|---|
| 8,004,053 B2 | 8/2011 | Miyagi et al. | |
| 8,309,858 B2 | 11/2012 | Kojima et al. | |
| 2006/0267109 A1 | 11/2006 | Ohguro | |
| 2009/0188709 A1 | 7/2009 | Kojima et al. | |
| 2010/0213039 A1* | 8/2010 | Saito | 200/181 |
| 2011/0095382 A1 | 4/2011 | Shimooka | |
| 2011/0291167 A1 | 12/2011 | Shimooka et al. | |
| 2012/0049390 A1 | 3/2012 | Shimooka et al. | |

FOREIGN PATENT DOCUMENTS

| | | |
|---|---|---|
| JP | 2007-216308 A | 8/2007 |
| JP | 2008-137139 A | 6/2008 |

* cited by examiner

*Primary Examiner* — Edwin A. Leon
*Assistant Examiner* — Iman Malakooti
(74) *Attorney, Agent, or Firm* — Holtz, Holtz, Goodman & Chick PC

(57) ABSTRACT

According to one embodiment, a MEMS device includes a first electrode formed on a support substrate, a second electrode arranged to face the first electrode and formed to be movable in a facing direction with respect to the first electrode, a beam portion formed on the support substrate and formed to support the second electrode, a cap layer formed to cover the second electrode and beam portion, a plurality of through-holes formed in the cap layer, the through-holes being formed in a portion other than a proximity portion in which a facing distance between the cap layer and a member in the cap layer is not longer than a preset distance, and a sealing layer formed to cover the cap layer and fill the through-holes.

19 Claims, 4 Drawing Sheets

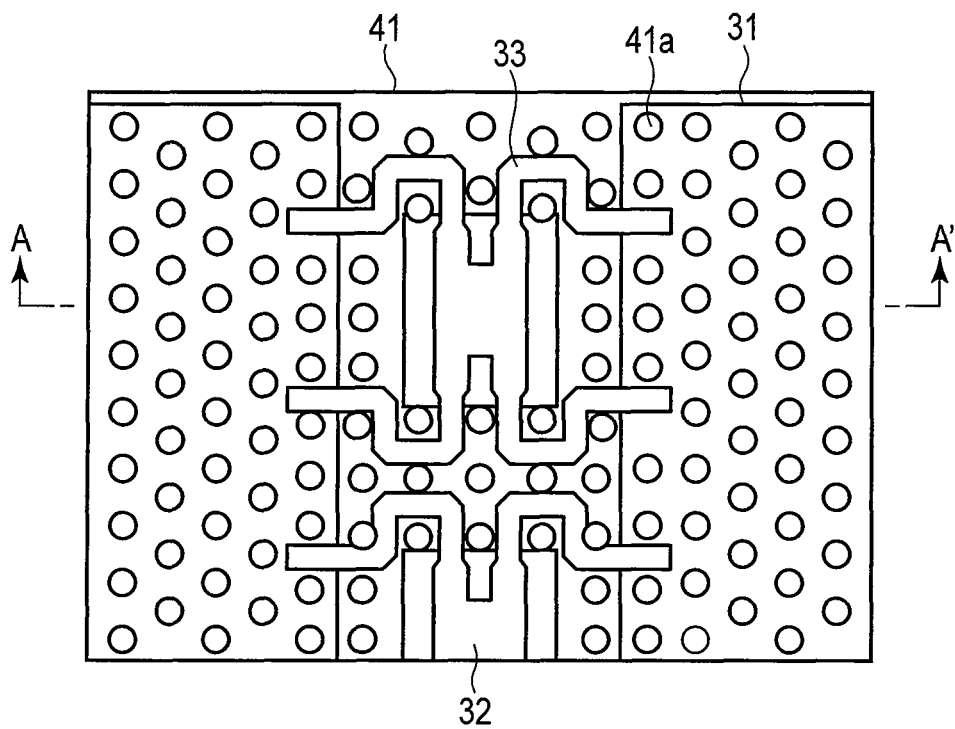
F I G. 1
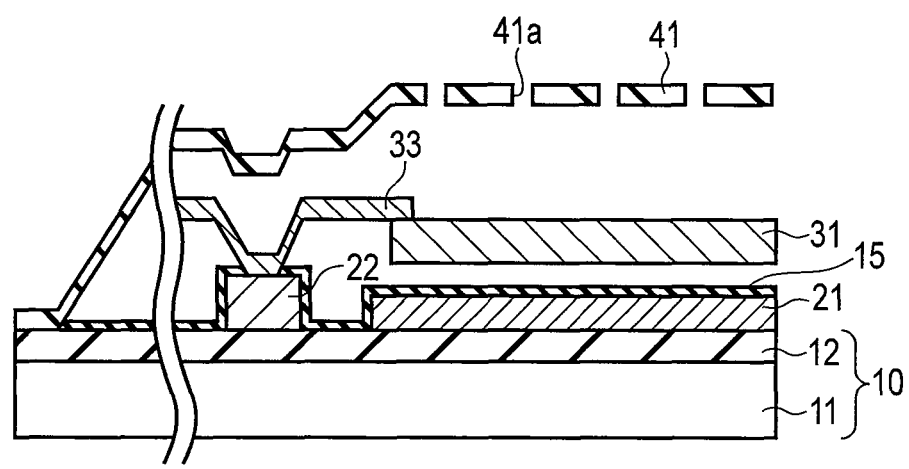
F I G. 2

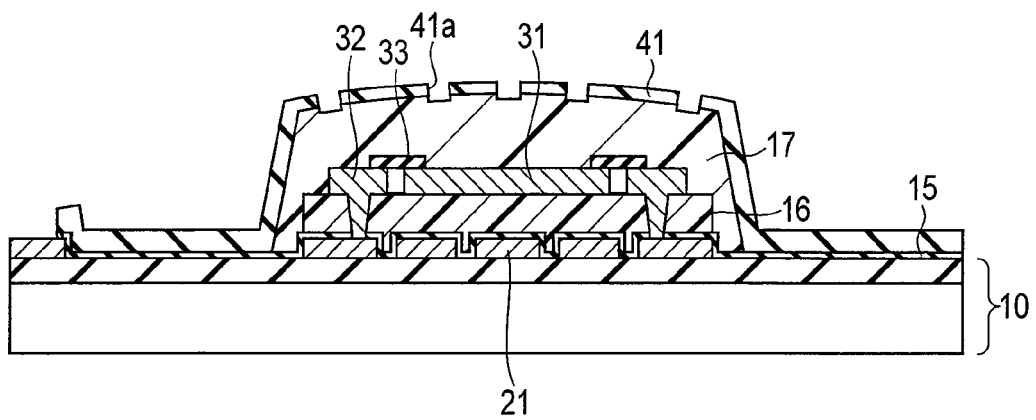
F I G. 3D
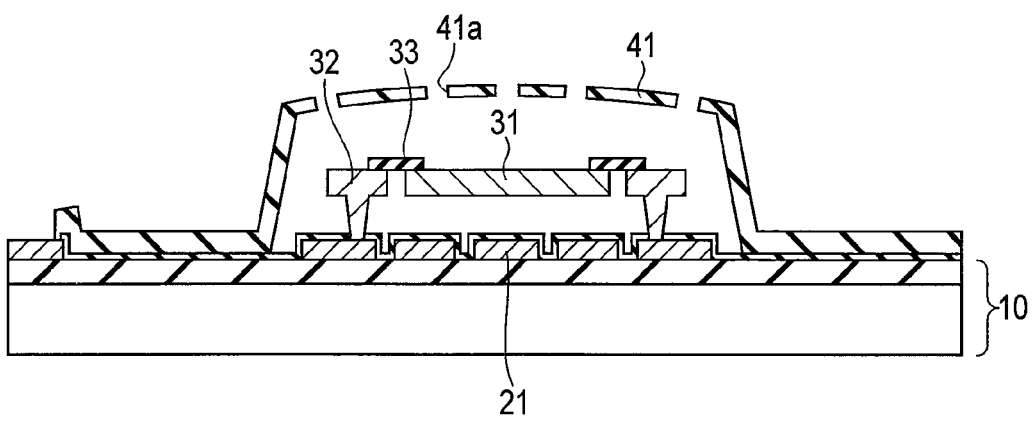
F I G. 3E
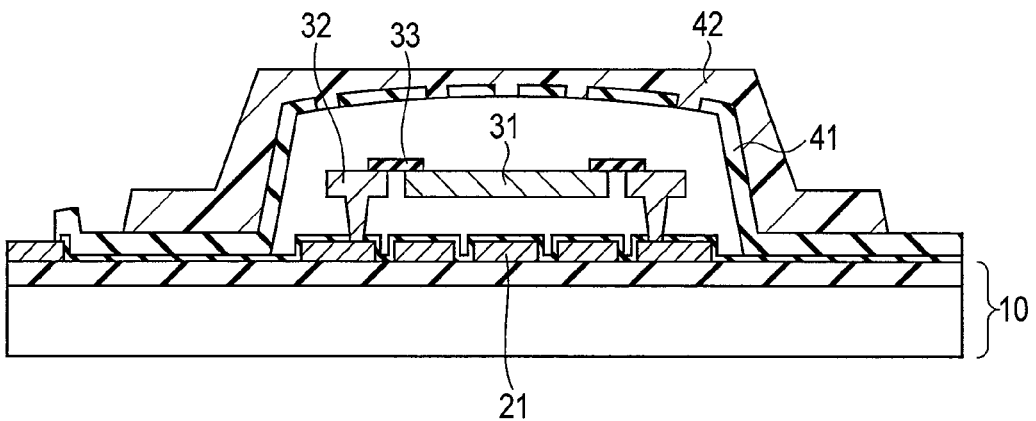
F I G. 3F

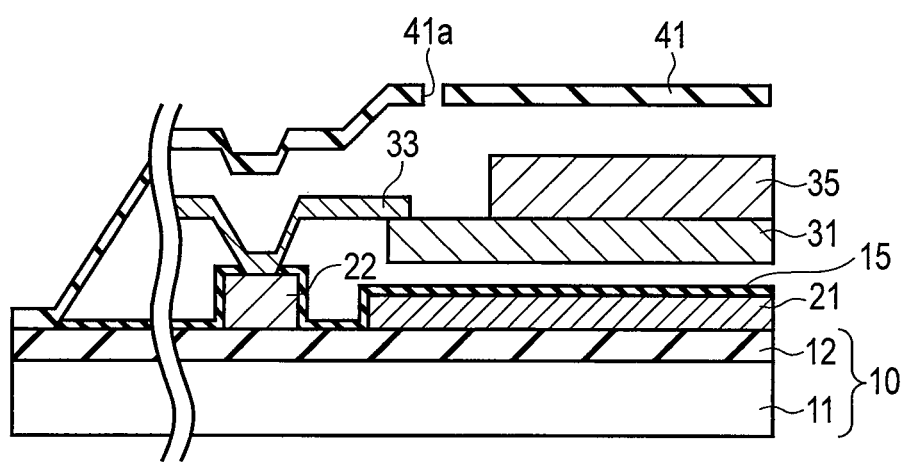
F I G. 4

MEMS DEVICE AND MANUFACTURING METHOD THEREOF

CROSS-REFERENCE TO RELATED APPLICATIONS

This application is based upon and claims the benefit of priority from Japanese Patent Application No. 2013-076323, filed Apr. 1, 2013, the entire contents of which are incorporated herein by reference.

FIELD

Embodiments described herein relate generally to a MEMS device and a manufacturing method thereof.

BACKGROUND

Since a micro-electromechanical systems (MEMS) device configured by use of a movable electrode and fixed electrode has a characteristic of low loss, high insulating property and high linearity, much attention is given thereto as a key device of a next-generation mobile phone. Further, by making use of the characteristic of the MEMS device, a MEMS capacitor whose capacitance can be varied is proposed.

In the MEMS device, it is required that the peripheral portion of a movable upper electrode arranged to face a lower fixed electrode and a beam portion that resiliently supports the upper electrode should have a hollow structure. Therefore, a sacrificial layer is formed to cover the upper electrode and beam portion and a cap layer having a plurality of through-holes formed therein is formed to cover the sacrificial layer. Then, the sacrificial layer is removed to form a hollow structure. After this, a resin sealing layer of an organic material or the like is formed on the cap layer to fill the through-holes.

However, in the conventional structure, there occurs a problem that an organic material penetrates into the hollow structure of the cap layer via the through-holes in the sealing step of forming the resin sealing layer on the cap layer. If the organic material penetrates into the hollow structure, the upper electrode and beam portion are suppressed from being movable and the elements do not function in the worst case. That is, a problem of lowering the manufacturing yield and lowering the reliability occurs due to penetration of a sealing material via the through-holes formed in the cap layer that covers the upper electrode and beam portion.

BRIEF DESCRIPTION OF THE DRAWINGS

FIG. 1 is a plan view showing the schematic configuration of a MEMS device according to a first embodiment.

FIG. 2 is a cross-sectional view taken along line A-A' in FIG. 1.

FIGS. 3A to 3F are cross-sectional views showing manufacturing steps of the MEMS device according to the first embodiment.

FIG. 4 is a cross-sectional view showing the configuration of the main portion of a MEMS device according to a second embodiment.

DETAILED DESCRIPTION

Figure 3A:
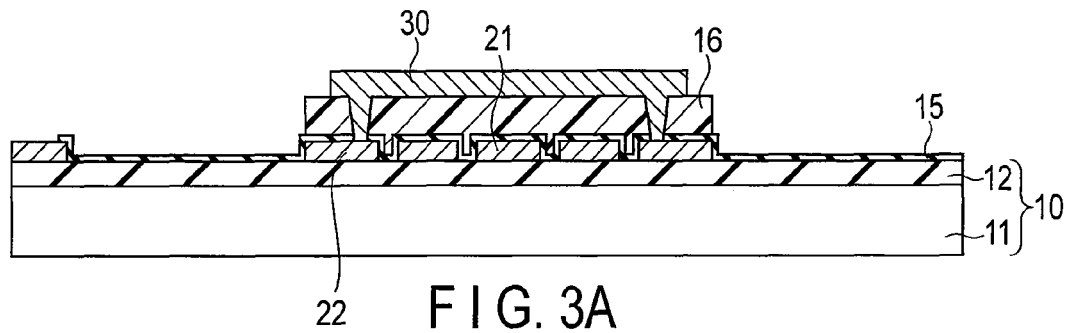

In general, according to one embodiment, a MEMS device comprises a first electrode formed on a portion of a support substrate, a second electrode arranged to face the first electrode and formed to be movable in a facing direction with respect to the first electrode, a beam portion formed on the support substrate and formed to support the second electrode, a cap layer formed to cover the second electrode and beam portion while forming a hollow region in a peripheral portion of the second electrode and beam portion, a plurality of through-holes formed in the cap layer, the through-holes being formed in a portion other than a proximity portion in which a facing distance between the cap layer and a member in the cap layer is not longer than a preset distance or the diameter of the through-holes in the proximity portion being made smaller than that of the other through-holes, and a sealing layer formed to cover the cap layer and fill the through-holes.

Next, a MEMS device of the present embodiment and a manufacturing method thereof are explained with reference to the accompanying drawings.

(First Embodiment)

FIG. 1 and FIG. 2 illustrate the schematic configuration of a MEMS device according to a first embodiment, FIG. 1 being a plan view and FIG. 2 being a cross-sectional view taken along line A-A' in FIG. 1.

A symbol 10 in FIG. 1 indicates a support substrate obtained by forming an insulating film 12 such as a silicon oxide film on a Si substrate 11 and elements such as field-effect transistors that configure a logic circuit and memory circuit may be formed in the substrate 10.

A lower electrode (first electrode) 21 used as a fixed electrode and an anchor portion 22 that fixes the beam portion are formed on the support substrate 10. For example, the lower electrode 21 is formed in a rectangular form and is formed of, for example, aluminum (Al) or an alloy containing Al as a main component. The composition material of the lower electrode 21 is not limited to the above material and copper (Cu), platinum (Pt), tungsten (W) or the like may be used. Further, the lower electrode 21 may be divided into plural portions.

A capacitor insulating film 15 with a thickness of 100 nm formed of, for example, a silicon nitride film is formed to cover the surface of the lower electrode 21. A material of the capacitor insulating film 15 is not limited to the silicon nitride film and a high-k film having a dielectric constant larger than that of $SiO_x$ or SiN may be used.

An upper electrode (second electrode) 31 used as a movable electrode is arranged above the lower electrode 21 to face the electrode 21. For example, the upper electrode 31 is formed of a ductile material such as Al, Al alloy, Cu, Au or Pt. However, the material is not limited to the ductile material and a brittle material such as tungsten (W) may be used.

A portion of the upper electrode 31 is connected to the anchor portion 22 formed on the support substrate 10 via a first spring portion (beam portion) 33. That is, one end of the first spring portion 33 is fixed on the anchor portion 22 and the other end thereof is fixed on the upper surface of the upper electrode 31. Further, the first spring portions 33 and anchor portions 22 are provided on plural portions of the upper electrode 31. For example, the first spring portion 33 is formed of a silicon nitride film and is formed in a meandering form to possess elasticity. The upper electrode 31 is movable in a vertical direction by the action of the spring portion 33.

Further, a portion of the upper electrode 31 is connected to an anchor portion (not shown) formed on the support substrate 10 via a second spring portion (not shown) having conductivity. A portion of the upper electrode 31 may be formed to extend and the second spring portion may be integrally formed with the upper electrode 31. The second spring portion is used for electrical connection with the upper electrode 31 and is formed of an extremely fine elastic material such as Al.

A cap layer 41 formed of a silicon oxide film is formed to cover the upper electrode 31 and first spring portion 33 while forming a hollow portion around the upper electrode 31 and first spring portion 33. A plurality of circular through-holes 41a used for removing a sacrificial layer that will be described later are formed in the cap layer 41. The diameter of the through-hole 41a may be preferably set larger from the viewpoint of removal of the sacrificial layer but may be preferably set smaller in view of prevention of penetration of resin used for forming a resin sealing layer that will be described later. In this embodiment, the diameter of the through-hole 41a is set to 10 μm or less, for example, 7 μm.

Unlike the conventional case, the through-holes 41a formed in the cap layer 41 are formed in a region other than the region lying above the spring portion 33 as shown in FIG. 1. It is preferable to uniformly arrange the through-holes 41a in order to remove the sacrificial layer, but since the through-holes are not arranged above the spring portion 33, it is impossible to completely uniformly arrange the through-holes. Therefore, in this embodiment, every adjacent three of the through-holes are uniformly arranged to form an equilateral triangle in a region other than the region above the spring portion 33, that is, in a region above the upper electrode 31.

It is understood based on the study by the inventors that a sacrificial layer cannot be completely removed depending on the arrangement of the through-holes when the sacrificial layer is removed. For example, it is understood that a sacrificial layer cannot be completely removed in a central portion of a lattice when the sacrificial layer is removed in a case where the through-holes are arranged in a square lattice of a two-dimensional lattice.

The arrangement of an oblique lattice (four through-holes configuring the square lattice form a parallelogram) is obtained by shifting the lattice of the square lattice in the Y-direction for the through-holes arranged as the square lattice of the two-dimensional lattice in X- and Y-directions and, as a result, the distance from the nearest through-hole to the central portion is reduced and the sacrificial layer can be easily removed.

Likewise, in comparison with a case where the arrangement of a rectangular lattice is obtained by shifting the lattice of a rectangular lattice of the two-dimensional lattice in the Y-direction, the distance from the nearest through-hole to the central portion is reduced and the sacrificial layer can be easily removed.

Further, the arrangement of a hexagonal lattice (four through-holes configuring the square lattice form a rhomb and adjacent three through-holes form an equilateral triangle) is obtained by shifting the lattice of a rectangular lattice of a two-dimensional lattice in the Y-direction and, as a result, the distance from the nearest through-hole to the central portion can be reduced while the through-holes are uniformly arranged. Thus, the sacrificial layer can be more easily removed. That is, the sacrificial layer can be easily removed by arranging the six through-holes that are adjacent as viewed from one through-hole in a honeycomb pattern.

When the through-holes 41a are required above the spring portion 33 to remove the sacrificial layer, the diameter of the through-holes 41a above the spring portion 33 may be set smaller than the diameter of the through-holes 41a above the upper electrode 31. Next, the manufacturing method of the MEMS device of this embodiment is explained with reference to FIGS. 3A to 3F.

First, as shown in FIG. 3A, a metal film of Al or the like is formed to a thickness of several hundred nanometers to several micrometers on a support substrate 10 having an insulating film 12 of, for example, a silicon oxide film formed on a semiconductor substrate 11 of Si or the like. Lower electrodes 21 and anchor portions 22 are formed by patterning the metal film. Then, a capacitor insulating film 15 of SiN or the like is formed on the support substrate 10 to cover the lower electrodes 21 by use of a chemical vapor deposition (CVD) method or the like. As a material of the capacitor insulating film 15, not only the silicon nitride film but also a high-k film having a dielectric constant larger than that of $SiO_x$ or SiN may be used.

Next, after an organic material such as polyimide is coated as a first sacrificial layer 16, the first sacrificial layer 16 is patterned into a desired form. As the patterning method, a method of subjecting the layer to an exposure/development process and then patterning the same after the sacrificial layer 16 is coated with a thickness of several hundred nanometers to several micrometers may be used. Alternatively, a pattern may be formed on the sacrificial layer 16 by use of a resist pattern formed by using a normal lithography method and a reactive ion etching (RIE) method. Further, a hard mask may be formed by patterning a SiO film or the like formed on the sacrificial layer 16 by use of a resist pattern formed by the normal lithography method and an RIE method or wet etching method and then a pattern may be formed by use of the hard mask.

Next, a metal film 30 of, for example, Al is formed with a film thickness of several hundred nanometers to several micrometers and then an unwanted portion is removed for formation of the upper electrodes and anchor portions.

Figure 3B:
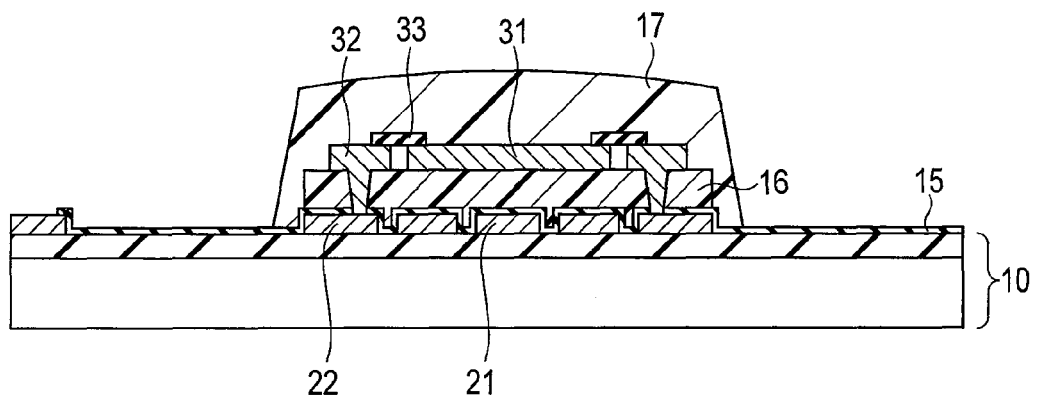

Then, as shown in FIG. 3B, the metal film 30 is patterned to form an upper electrode 31 and anchor portions 32. Subsequently, first spring portions (beam portions) 33 that connect the upper electrode 31 and respective anchor portions 32 are formed. For formation of the spring portion 33, a silicon nitride film or the like is formed and then the film may be patterned into a form of the spring portion by use of the RIE method. In this case, a gap between the upper electrode 31 and the anchor portion 32 may be previously filled with the same material as that of the sacrificial layer 16.

In FIG. 3B, the anchor portion 32 is formed on the anchor portion 22 and the spring portion 33 is fixed on the anchor portion 32. However, as shown in FIG. 2, the spring portion 33 may be directly fixed on the anchor portion 22. As shown in FIG. 3B, the spring portion 33 can be made flat in a plane parallel to the surface of the upper electrode 31 by forming the anchor portion 32 on the anchor portion 22 and setting a portion that fixes the spring portion 33 at the same height as the upper electrode 31.

In the order of processing steps of forming the upper electrode 31 and spring portion 33, the spring portion 33 may be patterned after the upper electrode is formed or the upper electrode 31 may be formed after the spring portion 33 is patterned.

Next, a thin-film dome formation step is performed.

Figure 3C:
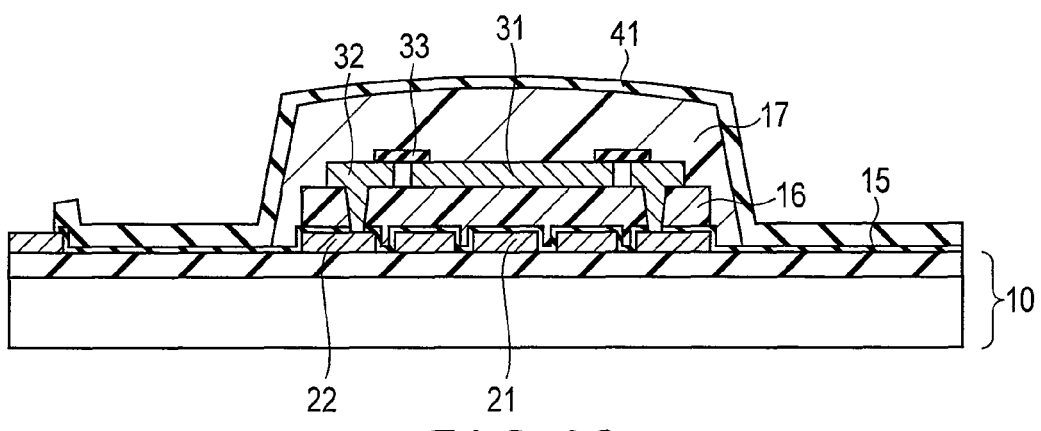

As shown in FIG. 3C, a second sacrificial layer 17 formed of an organic material such as polyimide is coated and formed to cover the upper electrode 31, anchor portions 32 and spring portions 33. The sacrificial layer 17 is coated to a thickness of several hundred nanometers to several micrometers and then patterned into a desired form. As the patterning method, a method of subjecting the sacrificial layer 17 to an exposure/development process and then patterning the same after the sacrificial layer 17 is coated to a thickness of several hundred nanometers to several micrometers may be used. Alternatively, a pattern may be formed on the sacrificial layer 17 by use of a resist pattern formed by using a normal lithography method and a RIE method. Further, a resist pattern is formed on a SiO film on the sacrificial layer 17 by use of a normal lithography method, and then a hard mask is formed in an RIE method or wet etching method. A pattern may be formed by use of this hard mask.

Next, for formation of a thin-film dome, an insulating film such as a SiO film is formed with a thickness of several hundred nanometers to several micrometers by use of a CVD method or the like. After this, a cap layer 41 is formed by patterning the insulating film by use of a resist pattern formed by a normal lithography method.

Then, as shown in FIG. 3D, circular through-holes 41a used for removing the sacrificial layers 16, 17 are formed in the cap layer 41 by use of the RIE method or wet etching method. At this time, the through-holes 41a are not arranged above the spring portions 33 formed inside the dome. Further, adjacent three of the through-holes 41a are arranged in an equilateral triangular form above the upper electrode 31.

When the through-holes 41a are required above the upper electrode 31 for removing the sacrificial layer, the diameter of the through-hole 41a above the spring portion 33 is made smaller than that of the through-hole 41a above the upper electrode 31. Specifically, the diameter is made smaller so as to almost prevent sealing resin from penetrating via the through-holes at the time of formation of a resin sealing layer 42 that will be described later. As a result, penetration of sealing resin via the through-hole 41a above the spring portion 33 can be avoided.

Next, as shown in FIG. 3E, the first and second sacrificial layers 16, 17 are removed by means of the through-holes 41a by use of a method of ashing using gaseous $O_2$ or the like. As a result, a hollow structure is formed around the upper electrode 31 and spring portions 33. That is, a state in which the upper electrode 31 and spring portions 33 are movable is set.

Finally, as shown in FIG. 3F, an organic material such as polyimide is coated to form a film and the film is patterned to form a resin sealing layer 42. As the patterning method of the resin sealing layer 42, a method of subjecting the resin sealing layer 42 to an exposure/development process and patterning the same after the layer is coated to a thickness of several hundred nanometers to several micrometers may be used. Alternatively, a patterning process may be performed by use of a resist pattern formed on the resin sealing layer 42 by a normal lithography method and an RIE method. Further, a resist pattern is formed on a SiO film on the resin sealing layer 42 by use of a normal lithography method, and then a hard mask is formed in an RIE method or wet etching method. A pattern may be formed by use of this hard mask.

After this, although not shown in the drawing, an insulating film such as a SiN film that plays a role as a damp-proofing film is formed to a thickness of several hundred nanometers to several micrometers by use of a CVD method or the like. Then, a pattern of electrode openings or the like is formed by use of a normal lithography method and an RIE method or wet etching method to complete a thin-film dome structure.

Thus, in this embodiment, since the through-holes 41a are formed in the cap layer 41 in the region other than the region above the spring portions 33 or the diameter of the through-holes 41a formed above the spring portions 33 is set smaller, resin can be suppressed from penetrating into the thin-film dome. This is attained by the following reason.

When the sealing resin shown in FIG. 3F is formed, the organic resin cannot be avoided from slightly overflowing from the through-holes 41a of the cap layer 41 into the thin-film dome. However, it is considered that the organic resin that has penetrated into the thin-film dome will be returned since the organic resin shrinks because of curing.

The spring portion 33 is formed in the highest position in the thin-film dome and the distance from the undersurface of the through-hole 41a of the cap layer 41 to the spring portion 33 is short. If the through-hole 41a is present above the spring portion 33, resin that has penetrated into the thin-film dome via the through-hole 41a may come into contact with the spring portion 33. If the resin makes contact with the spring portion 33, the resin is adsorbed on the spring portion 33 and increasingly penetrates into the thin-film dome. In this case, the resin will remain in the thin-film dome even if the organic resin is cured. This becomes a factor that prevents the spring portion 33 from being smoothly moved.

On the other hand, in this embodiment, since the through-holes 41a are not formed above the spring portions 33, it is possible to previously prevent an organic material from penetrating into the thin-film dome from the through-holes 41a and making contact with the spring portion 33. The same effect can be attained by setting small the diameter of the through-hole 41a formed above the spring portion 33. That is, the resin can be prevented from remaining in the thin-film dome and a factor that obstructs the operation of the spring portion 33 can be eliminated.

Thus, according to this embodiment, since the through-holes 41a are formed in the cap layer 41 for formation of the thin-film dome in the region other than the region above the spring portions 33 or the diameter of the through-holes 41a formed above the spring portions 33 is set smaller, resin can be suppressed from penetrating into the thin-film dome. Therefore, the manufacturing yield and reliability of the MEMS device can be enhanced.

(Second Embodiment)

FIG. 4 is a cross-sectional view showing the configuration of the main portion of a MEMS device according to a second embodiment. The same portions as those of FIG. 2 are denoted by the same symbols and the detailed explanation thereof is omitted.

This embodiment is different from the first embodiment explained before in that through-holes 41a in a portion that is closer to the undersurface of the cap layer 41 rather than the spring portion 33 are eliminated.

In this embodiment, for example, a conductive film 35 used for reducing the resistance of an upper electrode 31 is formed on the upper electrode 31 and the upper surface of the conductive film 35 is set higher than the spring portion 33. In this case, there occurs a possibility that sealing resin will make contact with the conductive film 35 in the step of FIG. 3F.

Therefore, in this embodiment, through-holes 41a are formed in a region other than a region above not only the spring portion 33 but also the conductive film 35. If it is required to form through-holes 41a above the spring portion 33 and conductive film 35 to remove a sacrificial layer, the diameter of the through-holes 41a above the spring portion 33 and conductive film 35 may be set smaller than that of the through-holes 41a above the electrode 31. As a result, sealing resin can be prevented from penetrating via the through-holes 41a above the spring portion 33 and conductive film 35.

Further, when not only the conductive film 35 but also any other member is placed on the upper electrode 31, through-holes 41a are not formed above a proximity portion in which the distance between the member and the undersurface of the cap layer is shorter than a preset value or the diameter of the through-holes 41a above the proximity portion is set smaller than that of the other through-holes like the case described before. In this case, the proximity portion indicates a portion that is shorter than the maximum extension length of resin that will penetrate into a dome via the through-hole 41a when organic resin is coated on the cap layer 41.

As described above, according to this embodiment, penetration of sealing resin from the through-holes 41a in the proximity portion can be avoided by forming the through-holes 41*a* in the cap layer 41 in a region other than the proximity portion in which the facing distance between the undersurface of the cap layer 41 and the member in the cap layer 41 is set less than a preset value or setting the diameter of the through-holes 41*a* in the proximity portion smaller than that of the other through-holes. Therefore, the same effect as that of the first embodiment can be attained.

(Modification)

This invention is not limited to the above embodiments.

The support substrate is not limited to the substrate obtained by forming the silicon oxide film on the Si substrate and an insulating substrate of glass or the like can be used. The beam portion of the upper electrode is not necessarily formed of a material different from that of the upper electrode and can be formed of the same material as the upper electrode and formed at the same time as formation of the upper electrode.

The embodiment is a system in which a voltage is applied between the upper and lower electrodes to drive the electrode by use of electrostatic force, but can be applied to a MEMS structural body of a system in which the electrode is formed of a laminated layer of different types of metals and is driven based on piezoelectricity thereof.

In the embodiments, an example of the MEMS capacitor is explained, but a MEMS switch can also be applied. In this case, the surface of the lower electrode is exposed by patterning and etching a portion of the capacitor insulating film formed on the lower electrode, for example, a portion that makes contact with the upper signal electrode. As a result, a switch is formed by use of the upper and lower electrodes and the electrode is driven by means of the vertical drive electrode to operate the switch.

In the embodiments, an example in which two electrodes including the lower and upper electrodes are used is explained, but the embodiment can be applied to a MEMS device configured by use of three or more electrodes (for example, a fixed upper electrode, fixed lower electrode and movable intermediate electrode).

Further, the size of the electrode can be freely designed according to the required capacitance.

Further, the opening shape of the through-hole formed in the cap layer is not limited to a circle, but may be set to an ellipse or polygon. In the embodiments, the through-holes are formed only on the upper wall side of the cap layer but can be formed on the sidewall side.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A MEMS device comprising:
a first electrode formed on a portion of a support substrate,
a second electrode arranged to face the first electrode and formed to be moveable in a facing direction with respect to the first electrode,
a beam portion formed on the support substrate and formed to support the second electrode,
a cap layer formed to cover the second electrode and beam portion while forming a hollow region in a peripheral portion of the second electrode and beam portion, the cap layer including a proximity portion at which a facing distance between the cap layer and a member covered by the cap layer is not longer than a preset distance,
a plurality of through-holes formed in the cap layer, such that (i) the through-holes are formed in a portion of the cap layer other than the proximity portion and an entirety of the proximity portion does not have through-holes formed therein, or (ii) a diameter of the through-holes formed in the proximity portion of the cap layer is smaller than a diameter of other through-holes formed in the cap layer and which are not formed in the proximity portion, and
a sealing layer formed to cover the cap layer.

2. The device according to claim 1, wherein the beam portion is formed of a material different from that of the second electrode.

3. The device according to claim 2, wherein the beam portion is formed of a silicon nitride film and is formed in a meandering form.

4. The device according to claim 2, further comprising an anchor portion provided on the support substrate, the beam portion being connected at a first end to the anchor portion and being fixed at a second end on an upper surface of the second electrode.

5. The device according to claim 1, wherein adjacent three of the through-holes are arranged to make an equilateral triangle in a region other than a region above one of the proximity portion and beam portion.

6. The device according to claim 1, further comprising a capacitor insulating film formed to cover the first electrode, the first and second electrodes configuring a variable capacitance element.

7. The device according to claim 1, wherein, in the portion other than the proximity portion, the through-holes are arranged in a two-dimensional square or rectangular lattice shifted in one direction.

8. A MEMS device comprising:
a first electrode formed on a support substrate,
a second electrode arranged to face the first electrode and formed to be moveable in a facing direction with respect to the first electrode,
a beam portion formed on the support substrate and formed to support the second electrode,
a cap layer formed to cover the second electrode and beam portion while forming a hollow region in a peripheral portion of the second electrode and beam portion,
a plurality of through-holes formed in the cap layer such that (i) the through-holes are formed in a portion of the cap layer other than a portion above the beam portion and the portion of the cap layer above the beam portion does not have through-holes formed therein, or (ii) a diameter of the through-holes formed in the portion of the cap layer above the beam portion is smaller than a diameter of other through-holes formed in the cap layer and which are not formed in the portion of the cap layer above the beam portion, and
a sealing layer formed to cover the cap layer.

9. The device according to claim 8, wherein the beam portion is formed of a material different from that of the second electrode.

10. The device according to claim 9, wherein the beam portion is formed of a silicon nitride film and is formed in a meandering form.

11. The device according to claim 9, further comprising an anchor portion provided on the support substrate, the beam portion being connected at a first end to the anchor portion and being fixed at a second end on an upper surface of the second electrode.

12. The device according to claim 8, wherein adjacent three of the through-holes are arranged to make an equilateral triangle in a region other than a region above the beam portion.

13. The device according to claim 8, further comprising a capacitor insulating film formed to cover the first electrode, the first and second electrodes configuring a variable capacitance element.

14. The device according to claim 8, wherein, in the portion other than the portion above the beam portion, the through-holes are arranged in a two-dimensional square or rectangular lattice shifted in one direction.

15. A MEMS device manufacturing method comprising:
forming a first electrode on a portion of a support substrate,
forming a first sacrificial layer to cover the first electrode,
forming a second electrode on the first sacrificial layer to be moved in a facing direction with respect to the first electrode and a beam portion formed to support the second electrode,
forming a second sacrificial layer to cover the second electrode and beam portion,
forming a cap layer formed to cover the second sacrificial layer, the cap layer having a proximity portion at which a facing distance between the cap layer and a member covered by the cap layer is not longer than a preset distance,
forming a plurality of through-holes in the cap layer, such that (i) the through-holes are formed in a portion of the cap layer other than the proximity portion distance and an entirety of the proximity portion does not have through-holes formed therein, or (ii) a diameter of the through-holes formed in the proximity portion of the cap layer is smaller than a diameter of other through-holes formed in the cap layer and which are not formed in the proximity portion,
removing the first and second sacrificial layers via the through-holes of the cap layer, and
forming a sealing layer to cover the cap layer after the sacrificial layers are removed.

16. The method according to claim 15, further comprising forming an anchor portion on the support substrate at a same time of formation of one of the first and second electrodes, the beam portion that connects the anchor portion to the second electrode being formed after the second electrode is formed.

17. The method according to claim 15, wherein the beam portion is formed of a material different from that of the second electrode.

18. The method according to claim 17, wherein the forming the beam portion comprises forming a silicon nitride film to connect the anchor portion and second electrode and then processing the silicon nitride film in a meandering form.

19. The method according to claim 15, wherein adjacent three of the through-holes are arranged to make an equilateral triangle in a region other than a region of the proximity portion and or a region above the beam portion.

* * * * *